United States Patent
Stanziola et al.

[15] 3,697,764
[45] Oct. 10, 1972

[54] METHOD AND APPARATUS FOR GENERATING ELECTRICITY

[72] Inventors: Ralph T. Stanziola; George A. Shuster, both of Philadelphia, Pa.

[73] Assignee: S & S Research & Development Corp., Levittown, Pa.

[22] Filed: March 29, 1971

[21] Appl. No.: 128,668

[52] U.S. Cl. ..................290/42, 290/53, 417/333
[51] Int. Cl. ...........................................F03b 13/12
[58] Field of Search.....................417/330–333, 273; 290/43, 42, 53

[56] References Cited

UNITED STATES PATENTS

| | | |
|---|---|---|
| 1,864,499 | 6/1932 | Grigsby.................290/42 X |
| 831,890 | 9/1906 | Plane.....................417/273 |
| 2,706,077 | 4/1955 | Searcy...................417/333 |
| 2,109,173 | 2/1938 | Herndon.................417/333 |
| 896,572 | 8/1908 | Pepper...................417/333 |
| 1,482,713 | 2/1924 | Stein..................417/333 X |
| 163,451 | 5/1875 | Buckner...............290/53 X |

*Primary Examiner*—G. R. Simmons
*Attorney*—Seidel, Gonda & Goldhammer

[57] ABSTRACT

Motion of waves is converted into energy in the form of compressed air which is stored in large containers. Compressed air flowing from the containers is utilized to drive turbine-generators to generate electricity. The turbine-generators are selectively driven by stored energy which may be controlled. Generation of electricity may be varied to meet the demand regardless of the tides or the state of the waves.

16 Claims, 9 Drawing Figures

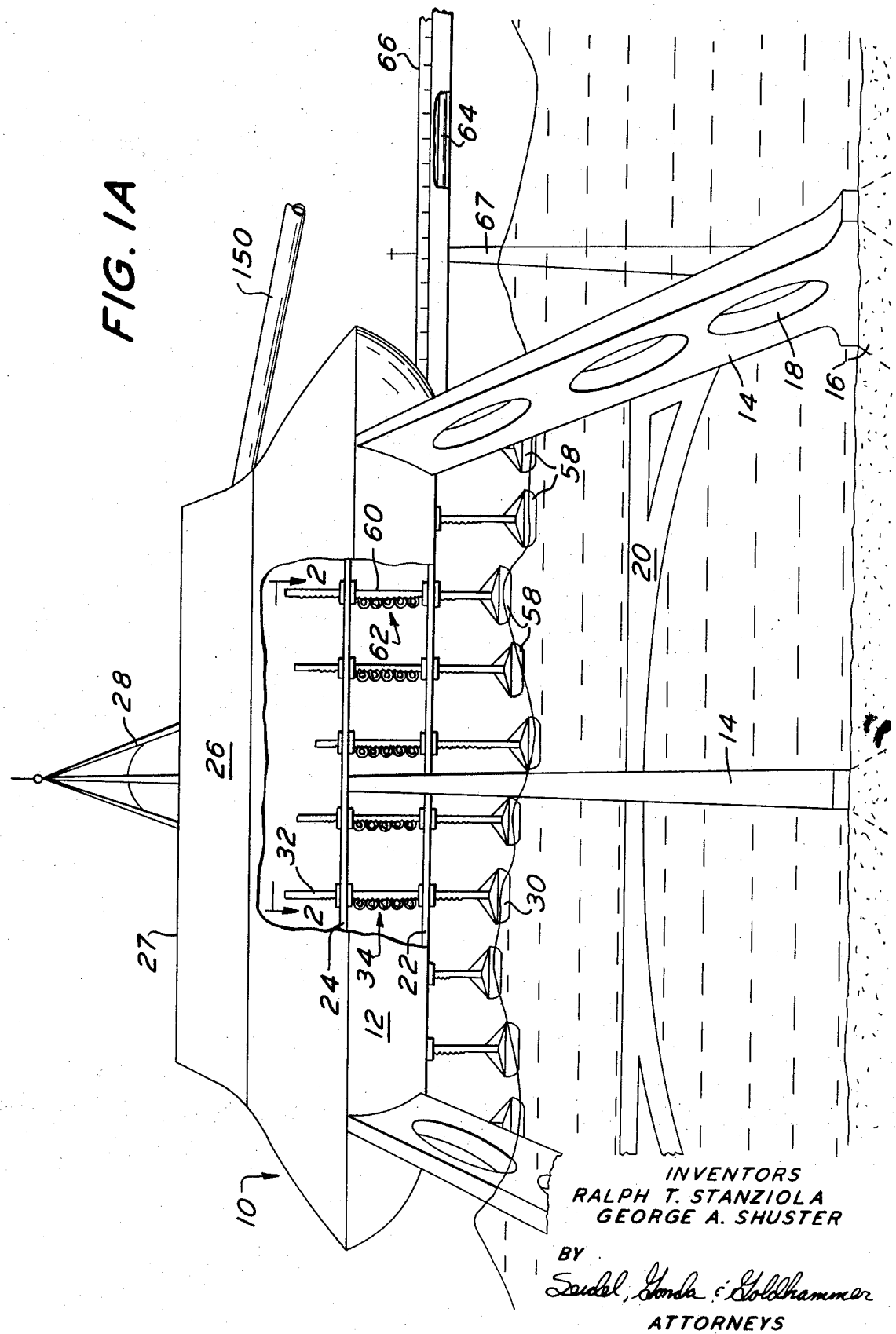

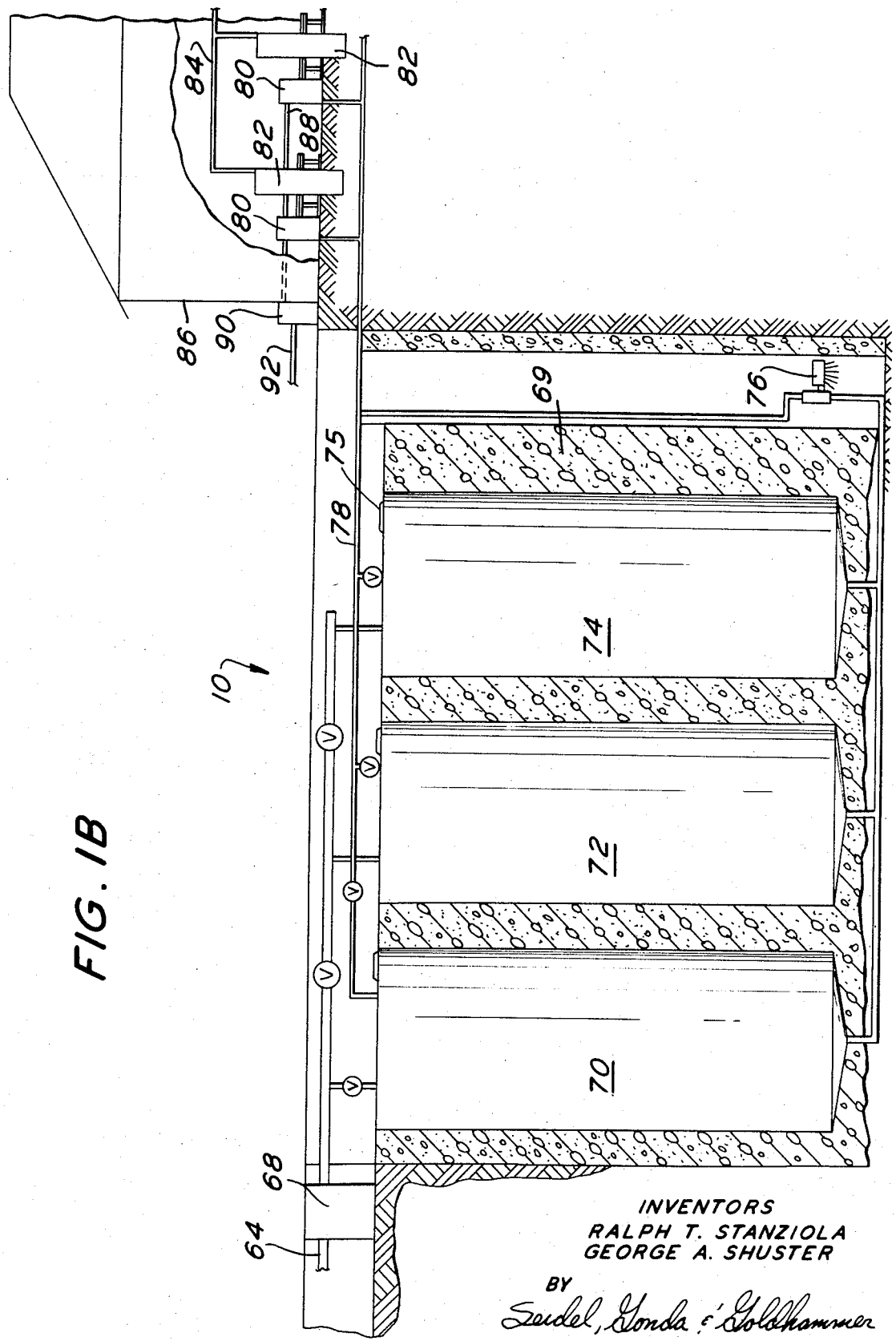

PATENTED OCT 10 1972 3,697,764

INVENTORS
RALPH T. STANZIOLA
GEORGE A. SHUSTER

BY
Seidel Gonda & Goldhammer
ATTORNEYS

INVENTORS
RALPH T. STANZIOLA
GEORGE A. SHUSTER

BY
Seidel, Gonda & Goldhammer
ATTORNEYS

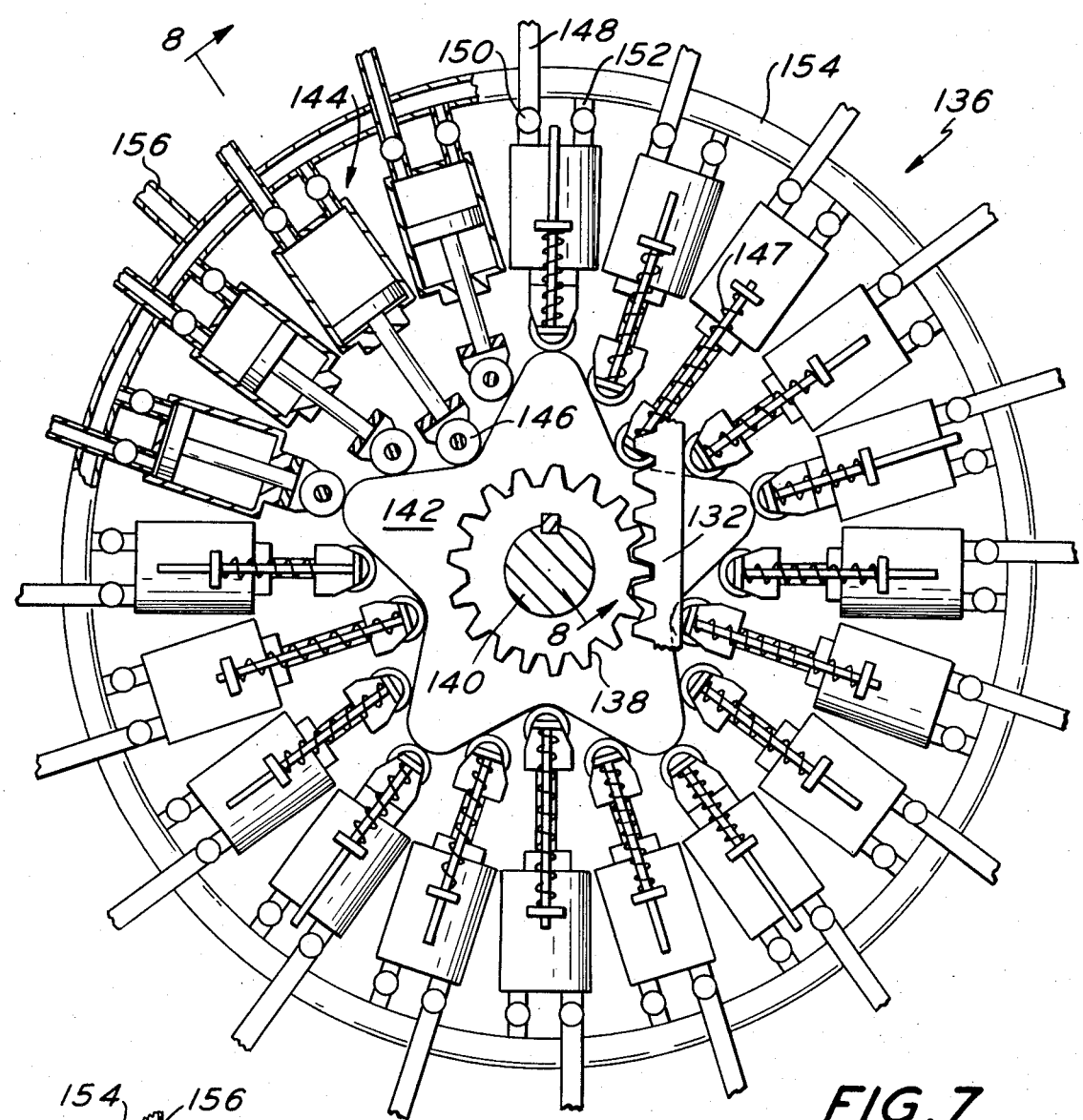
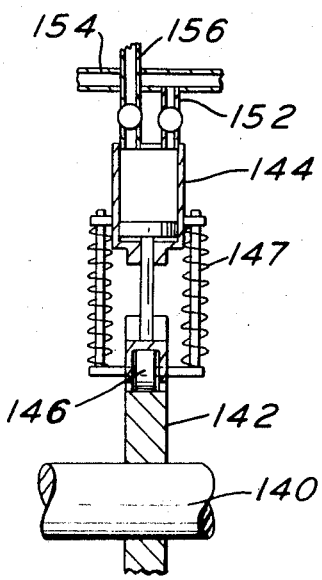
FIG. 7
FIG. 8
INVENTORS
RALPH T. STANZIOLA
GEORGE A. SHUSTER
BY
Seidel, Gonda & Goldhammer
ATTORNEYS

METHOD AND APPARATUS FOR GENERATING ELECTRICITY

From the beginning of time, mankind has sought to harness the power of the sea. Various motors and generators have been proposed heretofore which use the movement of waves or tides to generate power. It is believed that none of those devices has ever been utilized on any practical basis.

The present invention utilizes wave motion to generate power in a mode capable of being stored indefinitely. Thus, wave motion is converted to energy in the form of compounded compressed air which is stored in pressurized containers. Air is selectively withdrawn from the containers and utilized to generate electricity in any convenient manner such as by an air-driven turbine-generator.

From an ecological viewpoint, generation of electricity in this manner is highly desirable. No fuel is consumed and hence neither the air nor the sea is contaminated by refuse. The discharge from the air turbines may be filtered, compressed, and reused. Since the stored energy is in the form of compressed air, there is very little hazard of explosion and there is the added advantage of flexibility.

The flexibility resulting from the storing of the compressed air permits the turbine-generators to be driven at speeds consummate with the demand. Also, electricity may be generated regardless of the state of the sea or ocean; that is, the compressing of air by wave motion may be terminated for short periods of time such as during hurricanes without interfering with the steady generation of electricity by the turbine-generators. The extent of time during which the turbine-generators may operate in this manner will of course depend upon the size of the containers or stored compressed air on hand.

In order to compress air for storage, there are provided a plurality of vertically reciprocable floats, each of which is preferably coupled to a plurality of air compressors. Air is compressed during the up and during the down stroke of the floats by use of an especially designed compressor.

The floats are guided for vertical reciprocation and located at a platform which is sufficiently far out in the sea or ocean so that the water depth produces sufficient and unimpaired wave conditions conducive to power generation.

The height and period of wave length of surface waves are dependent upon wind speed, duration of wind, and the fetch or distance over which the wind has acted on water. A wind of 20 knots will produce waves having an average wave length of 111 feet, an average height of 4.9 feet, and will produce an average period of 5.7 seconds. We believe that the depth of water is significant.

According to the present invention, the wave motion is converted into energy capable of being stored such as compressed air at a location wherein the depth of the water has no material effect on the wave. We have found that this will occur in depths of approximately 80 feet or more. In shallow water, the speed of waves is reduced, the wave length is reduced, the waves become unstable so that the crest plunges forward as a breaker. These effects of shallow water should be avoided.

It is an object of the present invention to provide novel apparatus and method for generating electricity.

It is another object of the present invention to provide apparatus and method for generating electricity using waves of the sea or ocean.

It is another object of the present invention to provide apparatus and method for generating electricity using wave motion, the same being accomplished in a highly ecological and economical manner which provides considerable flexibility.

It is another object of the present invention to provide a flexible manner for generating electricity which utilizes energy in a form capable of being stored indefinitely.

It is another object of the present invention to provide apparatus and method for generating electricity which is flexible so that electricity can be generated as a function of demand.

Other objects will appear hereinafter

For the purpose of illustrating the invention, there is shown in the drawings a form which is presently preferred; it being understood, however, that this invention is not limited to the precise arrangements and instrumentalities shown.

FIG. 1A is a side elevation view of the lefthand end of the apparatus in accordance with the present invention.

FIG. 1B is a vertical sectional view of the right-hand end of the apparatus in accordance with the present invention.

FIG. 7 is a vertical sectional view of another compressor similar to that shown in FIG. 3.

FIG. 8 is a sectional view taken along the line 8—8 in FIG. 7.

Figure 2:
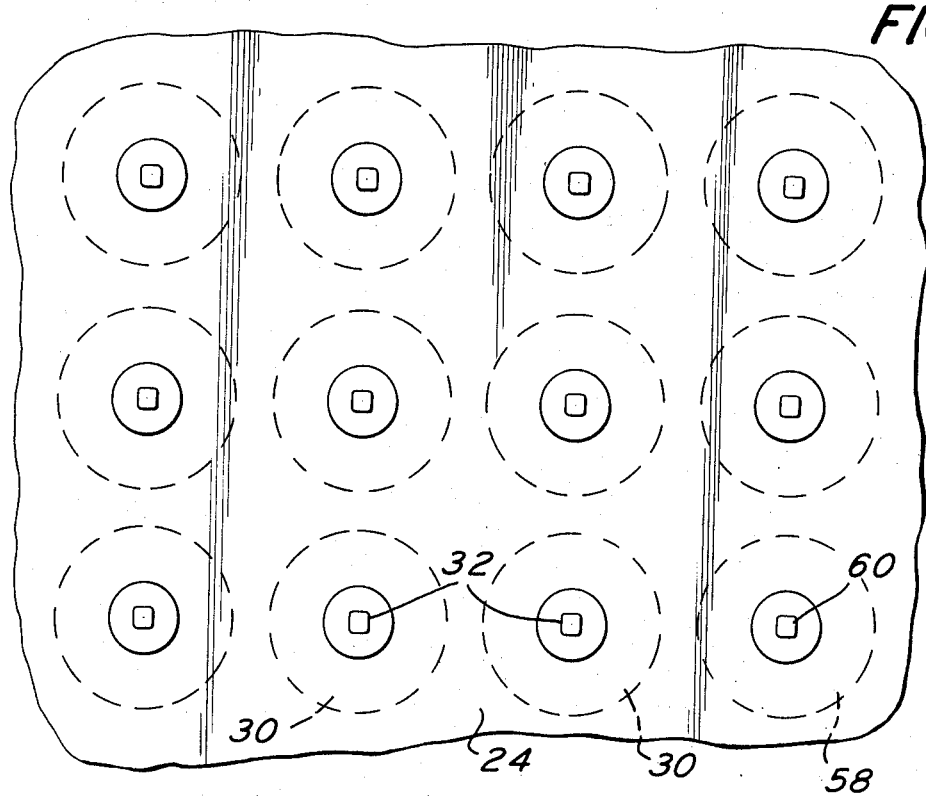
FIG. 2 is a view taken along the line 2—2 in FIG. 1A.

Referring to the drawing in detail, wherein like numerals indicate like elements, there is shown in FIGS. 1A and 1B apparatus for generating electricity in accordance with the present invention designated generally as 10. The apparatus 10 includes a building 12 supported in deep water having a depth of at least 80 feet by means of pillars 14. The pillars 14 are provided with a foundation 16. Transverse holes 18 are provided in the pillars so as to offer minimum resistance to waves. The pillars 14 are interconnected with one another by struts 20 disposed below the water level. The struts 20 also are provided with holes comparable with holes 18.

The building 12 includes a bottom floor 22 and an intermediate floor 24, as well as a roof 26. An antenna tower 28 or a lighthouse may be mounted on the flat top surface 27 of the roof 26. The flat surface 27 can be used as a service heliport.

Banks of longitudinally and transversely extending floats 30 are supported by the housing 12. See FIGS. 1A and 2. Each of the floats 30 is provided with a stem means 32 extending through and guided by rails and rollers affixed to the floors 22 and 24 on the housing 12.

Each of the stem means 32 is connected to banks 34 of compressor units 36 disposed one above the other. EAch of the compressor units 36 is identical. Accordingly, only one compressor unit 36 will be described in detail.

Figure 3:
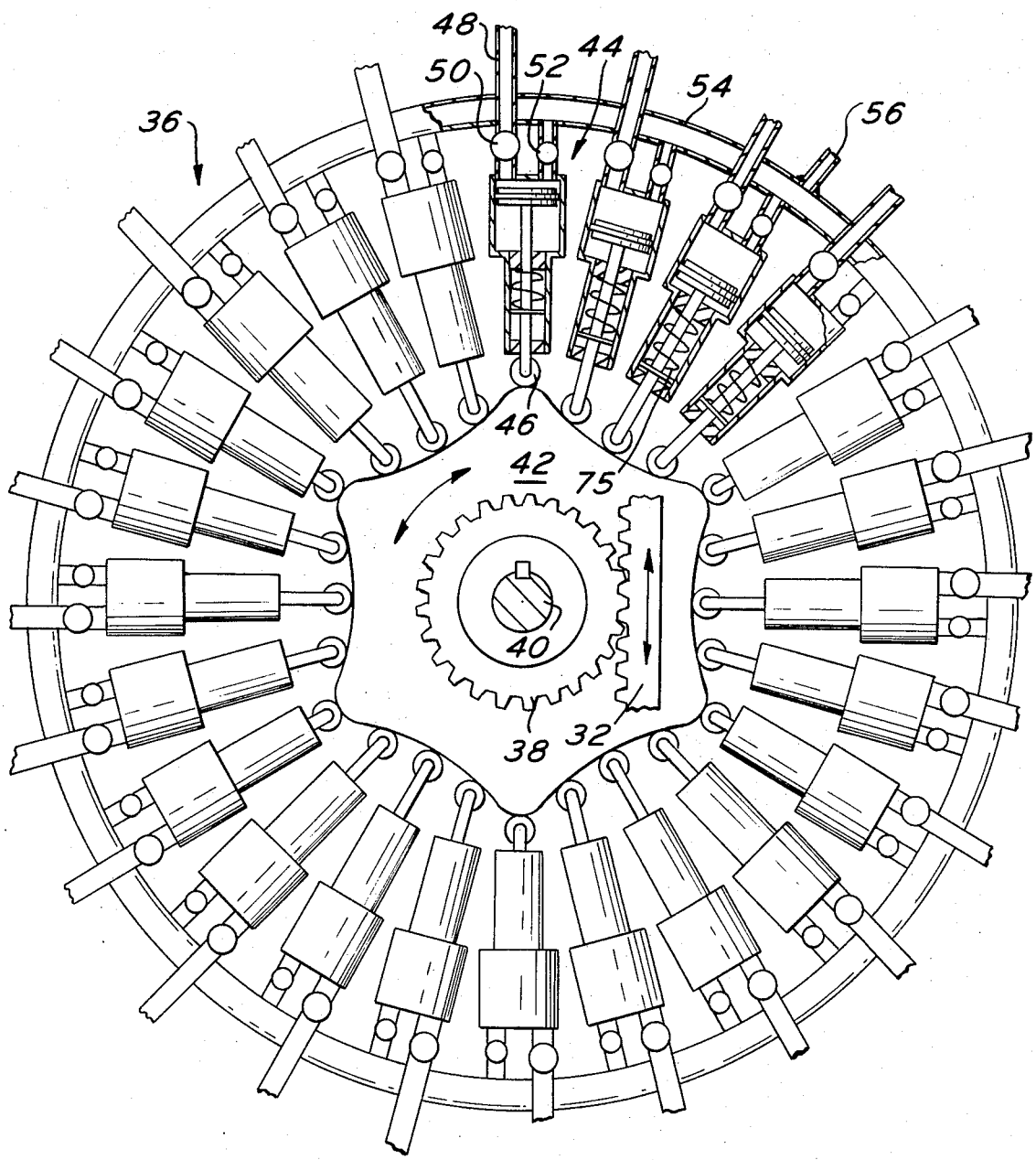
FIG. 3 is a vertical sectional view on an enlarged scale of one radial compressor of the banks of radial compressors shown in FIG. 1A.

Referring to FIG. 3, it will be noted that the operative portion of the stem means 32 on each of the floats 30 is provided with a rack meshed with a gear 38 on shaft 40. A cam 42 is secured to shaft 40 and rotates therewith. The circumference of gear 38 is chosen so that the cam 42 makes one complete revolution on the upstroke and one complete revolution on the downstroke on the float 30. An average wave has a height of 5 feet, therefore the circumference of gear 38 is 5 feet.

A plurality of compressors 44 are disposed circumferentially around the cam 42. Each compressor 44 includes a cylinder and piston arrangement with the piston rod terminating at one end in a follower 46 biased by spring 47 into engagement with the cam 42. Each cylinder is provided with an inlet conduit 48 controlled by a one-way valve 50. Each cylinder 44 is provided with an outlet conduit 52 having a one-way valve. Each conduit 52 communicates with a circumferentially disposed collecting manifold 54. Each manifold 54 is provided with an outlet conduit 56.

Each of the compressors 44 in the compressor unit 36 takes atmospheric air and compresses the same to a first pressure. Air at this first pressure is communicated by way of the conduits 56 to the inlet side of similar compressors forming a part of the bank of compressor units of the bank 62. The compressor units 62 are operated in the same manner as described above by way of stem means 60 on floats 58. The compressor units 60, 62 compress the air to a second higher pressure. Thereafter, the compressed air at the second higher pressure is transmitted by way of conduit 64 to a plurality of large storage tanks 70, 72, 74, etc. Conduit 64 is supported by a service causeway 66 mounted on pillars 67. If desired, the causeway 66 may be laid on the sea bottom.

A pressure regulator 68 is provided in conduit 64 to assure that the pressure introduced into the storage tanks is at a pressure above a predetermined minimum. The storage tanks 70–74 are mounted on land underground within a reinforced concrete casing 69.

A condensate drainage means 76 communicates with the bottom of each of the tanks 70–74 for removing any accumulated moisture. Access means 75 are also provided on top of each tank for internal inspection, cleaning and repair. The tanks 70–74 each selectively communicate with a conduit 78 for transmitting the pressurized air from the storage tanks to one or more air turbines 80, each of which is coupled to a separate electrical generator 82. Each generator is provided with output lines 84.

The turbines and generators may be of conventional construction and are mounted in housing 86. The outlet of each of the turbines communicates with the inlet side of a compressor 90 by way of conduit 88. Compressor 90 filters and recompresses the discharge from the turbines and transmits the same by way of conduit 92 to conduit 64 upstream from the pressure regulator 68.

In the first embodiment of the present invention described above, it will be noted that the air compressors 44 are positioned so as to be on diametrically opposite sides of the periphery of the cam 42. In a second embodiment of the present invention illustrated in FIGS. 4 and 5, a similar structural interrelationship is attained. The second embodiment of the present invention is identical with that described above except for the cam and its relationship to the compressor units and stem means on the float.

Figure 4:
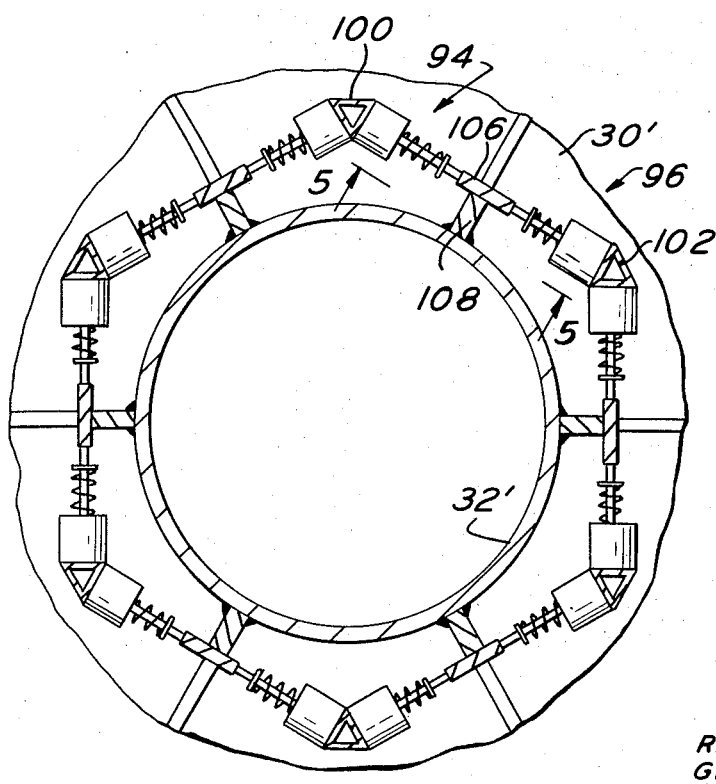
FIG. 4 is a transverse sectional view looking downwardly onto a float in accordance with another embodiment of the present invention.
Figure 5:
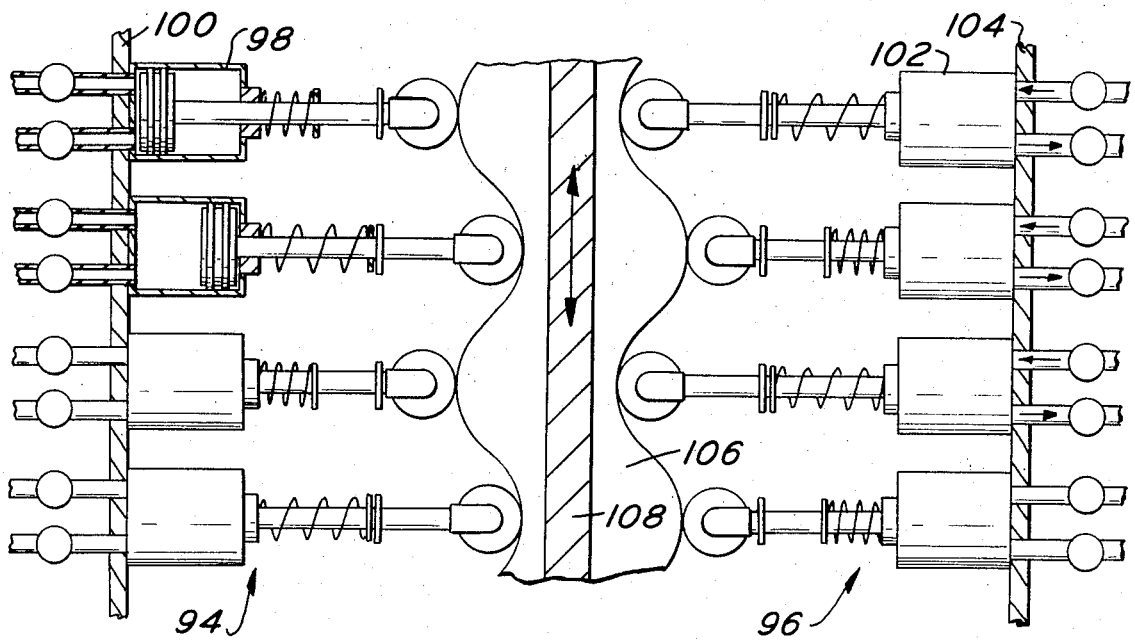
FIG. 5 is a sectional view taken along the line 5—5 in FIG. 4.

Referring to FIG. 4, the float 30' is provided with a hollow stem means 32'. Banks of compressor units 94 and 96 are sequentially disposed about the periphery of the stem means 32'. The bank of compressor units 94 includes a plurality of air compressors 98 disposed one above the other and supported by support structure 100. The bank 96 includes compressors 102 disposed one above the other and supported by support structure 104. See FIG. 5.

Ribs 108 extend radially outwardly from the periphery of the stem means 32' and circumferentially disposed points thereon. Each rib is connected to and supports a cam 106. Cam 106 is disposed between the banks 94 and 96 so that the compressors 98 and 102 are on diametrically opposite sides of the cam 106. Each of these compressors is constructed as described above and includes a follower in rolling engagement with the periphery of the cam 106. The support structures 100 and 104 extend between the floors 22 and 24.

Figure 6:
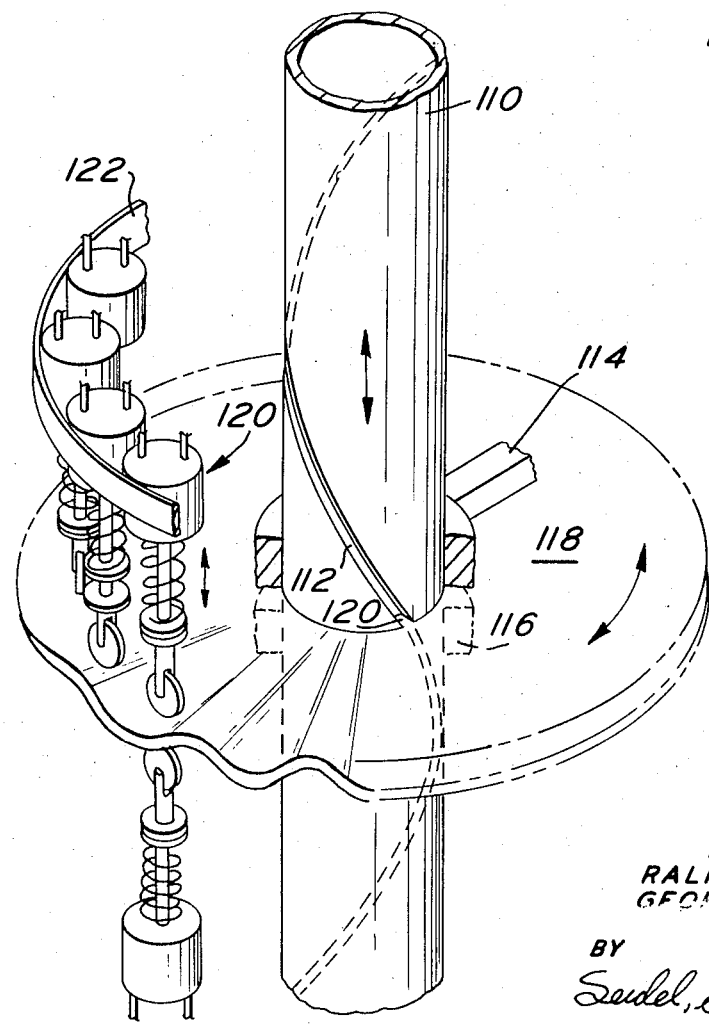
FIG. 6 is a partial perspective view of another compressor responsive to vertical movement of a float in accordance with the present invention.

In FIG. 6, there is illustrated a third embodiment of the present invention identical with the embodiment in FIGS. 1–3 except as will be made clear hereinafter. In FIG. 6, the stem means 110 on the float 30 is provided with a helical groove 112. A cam 118 surrounds the stem means 110 and is provided with a key 120 which enters the groove 112. The cam 118 is supported by housing 12 from above and below by support structure 114 and 116.

As the floats 30 move up and down with the waves, means 110 will similarly move up and down. As the stem means 110 moves up and down, the cam 118 will rotate about the axis of the means 110. The pitch of groove 112 causes cam 118 to rotate 360° during each up and down stroke of the floats. The periphery of cam 118 is provided with an undulating surface.

A bank of compressor units 120 is mounted above and below the cam 118 so as to be on opposite sides adjacent the periphery thereof. The compressors forming a part of the bank of compressor units 120 are identical with those described above. Each of the compressors is supported by a support structure 122.

Additional cams identical with cam 118 are similarly supported above and below the cam 118 so that the shaft means 110 operates a plurality of banks of compressor units.

In FIGS. 7 and 8, there is shown another radial compressor designated 136. Compressor 136 is identical with compressor 36 and is of the same overall size except as will be made clear hereinafter. The components of compressor 136 are the same as those in compressor 36 but with identifying numerals preceded by "1."

In compressor 136, the cylinders 144 are fewer in number but larger in size as compared with compressor 36. Cylinders 144 are preferably provided with a 10 inch bore and have a 10 inch stroke. Cam 142 has only five lobes while cam 42 has six lobes. Each compressor 136 will deliver 100 compression strokes per revolution of cam 142. The compressors 136 are preferably arranged in stacks five high.

The floats described above, by way of example, have a diameter of 40 feet, a height of 8 feet, a weight of 100 tons and have a stem which is 12 feet in diameter. A large embodiment of this invention would have 100 such floats.

It will be noted that each of the compressors has a piston stroke corresponding to the throw of the cam surface on the cams 42, 106, 118 and 142. In each embodiment, air compressors are mounted on opposite sides of the cam. Wave motion in the water is converted into energy in the form of compressed air by operating a bank of compressors utilizing an undulating cam surface which moves in response to movement of the floats. In each embodiment, there is a compounding of the air pressure.

Referring to FIG. 1A, it will be noted that the housing roof 26 may be hollow and thus perform the function of a reservoir for sea water. The reservoir may be connected to a hydro-generating installation on land by way of a gently sloping conduit 150. The reservoir has a height of about 150 feet above sea level so as to provide a sufficient head pressure to operate a hydro-generator of considerable capacity. Water withdrawn from the reservoir is preferably replenished by a siphon such as a compressed air siphon. Conduit 150 may be supported from below by the causeway 66.

The present invention supplies an answer to a problem which has become increasingly important in recent years. For example, in the Dec. 1, 1970 issue of *Look Magazine*, there is an article on pages 51 and 54 pointing out the need for other sources of electrical energy since the conventional means are reaching a point where they cannot be expanded without creating substantial ecological problems. Electric power demand doubles every ten years.

Heretofore, it has been proposed by others to generate electricity utilizing wave action. For example, see U.S. Pat. Nos. 163,451; 1,444,693; and 2,668,918. To our knowledge, none of the prior art devices have ever been acceptable from a commercial viewpoint because of one or more deficiencies in concept or design. The prior art disclosures with respect to apparatus of this nature did not fully utilize the up and down movement of the wave so as to be able to provide enough pumping action to obtain pressurized air at a high enough pressure and in sufficient quantities, were too fragile, etc. The prior art does not appear to have recognized the need to locate a housing 12 of significant proportion and structure sufficiently far out from the shore line so that the waves will be properly conducive to effective power generation.

Referring to the compressor unit 36 shown in FIG. 3, it will be noted that 24 compressors 44 are provided. Each time the cam 42 rotates through one complete cycle, 144 piston strokes will be attained for compressing air. Cam 42 will rotate through a complete cycle on the upstroke as well as on the downstroke of the float 30. Hence, each time each of the floats 30 moves up and down, 288 compressor strokes will be attained at each of the compressor units 36 operatively coupled to each stem means 32. Compressor units 136 are preferred over units 36 since the former will be at least three times more efficient even though both units have the same overall size.

The number of tanks 70–72 are sufficient in number and of sufficient size so that large amounts of compressed air may be stored indefinitely for use when needed in generating electricity in accordance with the demand. If the waves are excessively high, the floats may be raised in any convenient manner to an elevated position so as to be out of contact with the water. During any such period, a sufficient amount of compressed air will be stored in the tanks so that electricity may continue to be generated.

The staggering amount of energy potential available by use of the present invention is apparent from the following example. Assume that there are only thirty compressors of the type shown in FIGS. 7 and 8 wherein each cylinder will have five compression strokes per revolution of cam 142 or ten strokes for every wave assumed to be a 4 foot wave. Per day, 47 million cubic feet of air will be compressed. A 100-ton float will provide 580 horsepower when moved up and down a total linear distance of 8 feet at 5 second intervals. In one day, each such float would provide 580×17,280 waves per day or slightly more than 10 million HP per day, which is the equivalent of approximately 7.5 million kilowatts.

The present invention may be embodied in other specific forms without departing from the spirit or essential attributes thereof and, accordingly, reference should be made to the appended claims, rather than to the foregoing specification as indicating the scope of the invention.

We claim:

1. A method of generating electricity comprising the steps of converting wave motion of deep water into energy which can be stored, said converting steps including operating a plurality of compressors directly by an undulating surface on a cam, moving a plurality of said cams in response to movement of a plurality of floats in and up and down direction by waves in said water, collecting the energy output from a plurality of the compressors and storing said collected energy output in a container, and using energy stored in said container to drive an electrical generator.

2. A method in accordance with claim 1 wherein said step of converting wave motion into energy includes the step of compressing air, and said step of storing the energy includes storing the compressed air, and said step of using the energy including using the compress air to drive a turbine-generator.

3. A method in accordance with claim 1 wherein said step of storing said energy in the container includes using underground storage containers of great capacity.

4. A method in accordance with claim 1 wherein said converting step includes using a plurality of floats, using the up and down movement of each float to drive a plurality of air compressors to compress air at a first pressure, and using other floats to further compress said compressed air from said first pressure to a higher pressure, and said step of storing said energy including storing compressed air at said higher pressure.

5. Apparatus for generating electricity comprising a plurality of floats guided for up and down movement, at least one container, means for converting the up and down movement of said floats into energy capable of being stored in said container, said means including a cam having an undulating cam surface with a plurality of air compressors driven directly by said cam surface, the stroke of the compressors corresponding to the throw of the cam, means for transmitting said energy from said compressors to said container, and means for generating electricity including a turbine connected to said container for selective use of the energy stored in said container.

6. A method in accordance with claim 1 wherein said converting step includes operating each compressor with a plurality of power strokes per revolution of the cam.

7. Apparatus in accordance with claim 5 wherein said transmitting means includes a manifold conduit connected to said compressors and said container.

8. Apparatus in accordance with claim 5 wherein said compressors are arranged in a circle around said cam.

9. Apparatus in accordance with claim 5 wherein said compressors are on opposite sides of the cam.

10. Apparatus in accordance with claim 9 wherein said compressors are disposed one above the other, and said cam being integral with said floats.

11. Apparatus in accordance with claim 5 wherein said floats have an upright stem means, said cam being supported for rotation about the longitudinal axis of said stem means.

12. Apparatus for generating electricity comprising a housing supported in water having a depth of at least 80 feet, a plurality of floats guided for up and down movement by said housing, means on the housing for converting the up and down movement of the floats into energy capable of being stored in a container, said means including a cam having an undulating cam surface, a plurality of air compressors each having a cam follower, at least some of said compressors being on opposite sides of each cam surface and having their cam followers extending towards each other, the stroke of the compressors corresponding to the throw of the cam surface, at least one container, means for transmitting said energy from said compressors to said containers, and means for generating electricity including a turbine connected to said container for selective use of the energy stored in said container.

13. Apparatus in accordance with claim 12 including a manifold connected to the outlet of each compressor, the outlet of the manifold being connected to a second compressor means for compressing air to a still higher pressure before being transmitted to said container.

14. Apparatus in accordance with claim 12 wherein said container and said means for generating electricity are mounted on land with the container being below ground level.

15. Apparatus in accordance with claim 12 including a reservoir on said housing above said floats, and a downwardly sloping conduit extending from said reservoir.

16. Apparatus in accordance with claim 12 wherein said cam surface has a plurality of undulations each directly coupled to air compressor for operating a power stoke of the air compressor a plurality of times per movement of each float.

* * * * *